United States Patent
Hosoda

(10) Patent No.: US 9,681,235 B2
(45) Date of Patent: Jun. 13, 2017

(54) VIBRATION DETECTION COMPONENT, AND ACOUSTIC DEVICE AND INFORMATION APPARATUS USING VIBRATION DETECTION COMPONENT

(71) Applicant: FUJITSU LIMITED, Kawasaki-shi, Kanagawa (JP)

(72) Inventor: Masayuki Hosoda, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 12 days.

(21) Appl. No.: 14/858,024

(22) Filed: Sep. 18, 2015

(65) Prior Publication Data

US 2016/0094926 A1 Mar. 31, 2016

(30) Foreign Application Priority Data

Sep. 30, 2014 (JP) .................................. 2014-201818

(51) Int. Cl.
*H04R 23/00* (2006.01)
*G01H 9/00* (2006.01)

(52) U.S. Cl.
CPC ............. *H04R 23/008* (2013.01); *G01H 9/00* (2013.01); *H04R 2499/11* (2013.01)

(58) Field of Classification Search
CPC ......... H04R 23/008; H04R 29/00; H04R 3/00
USPC ........ 250/226, 559.16; 359/199.1, 305, 838; 381/58, 59, 172, 426; 385/13; 73/643; 235/462.01; 356/446; 362/19; 372/32
See application file for complete search history.

(56) References Cited

U.S. PATENT DOCUMENTS

| | | | | |
|---|---|---|---|---|
| 9,066,186 | B2* | 6/2015 | Burnett | G10L 21/0208 |
| 2002/0085727 | A1* | 7/2002 | Paritsky | H04R 1/083 381/172 |
| 2004/0032966 | A1* | 2/2004 | Liu | H04R 23/008 381/426 |
| 2004/0062406 | A1* | 4/2004 | Sakamoto | H04R 23/008 381/172 |
| 2004/0067005 | A1* | 4/2004 | Miyazawa | G01H 9/00 385/13 |
| 2004/0090686 | A1* | 5/2004 | Shinzou | G01D 5/26 359/838 |
| 2004/0099799 | A1* | 5/2004 | Shinzou | H04R 23/008 250/226 |
| 2004/0251435 | A1* | 12/2004 | Sawayama | G01N 21/55 250/559.16 |
| 2005/0052724 | A1* | 3/2005 | Suzuki | G01H 9/00 359/305 |
| 2005/0241398 | A1* | 11/2005 | Suzuki | G01N 29/2418 73/643 |

(Continued)

FOREIGN PATENT DOCUMENTS

JP 2002-243537 A1 8/2002

*Primary Examiner* — Gerald Gauthier
(74) *Attorney, Agent, or Firm* — Kratz, Quintos & Hanson, LLP

(57) ABSTRACT

A vibration detection component includes a diaphragm that has a light transparency; a light emitting element that emits light into the diaphragm at a certain inclination angle relative to a normal direction of the diaphragm; and a light receiving element that receives the light emitted from the light emitting element and reflected by an interface between the diaphragm and a medium in contact with the diaphragm and converts the light into an electric signal related to vibration of the diaphragm.

14 Claims, 15 Drawing Sheets

(56) References Cited

U.S. PATENT DOCUMENTS

| | | | |
|---|---|---|---|
| 2007/0013988 A1* | 1/2007 | Okada | G02B 26/0841 359/199.1 |
| 2009/0145968 A1* | 6/2009 | Kabeya | G06K 7/10831 235/462.01 |
| 2010/0321698 A1* | 12/2010 | Santhanakrishnan | G01H 9/00 356/446 |
| 2011/0032961 A1* | 2/2011 | Zang | G02B 5/04 372/32 |
| 2013/0101127 A1* | 4/2013 | Buchmann | H04R 29/005 381/58 |
| 2016/0094926 A1* | 3/2016 | Hosoda | H04R 23/008 381/59 |
| 2016/0195231 A1* | 7/2016 | Grotsch | F21S 48/114 362/19 |

* cited by examiner

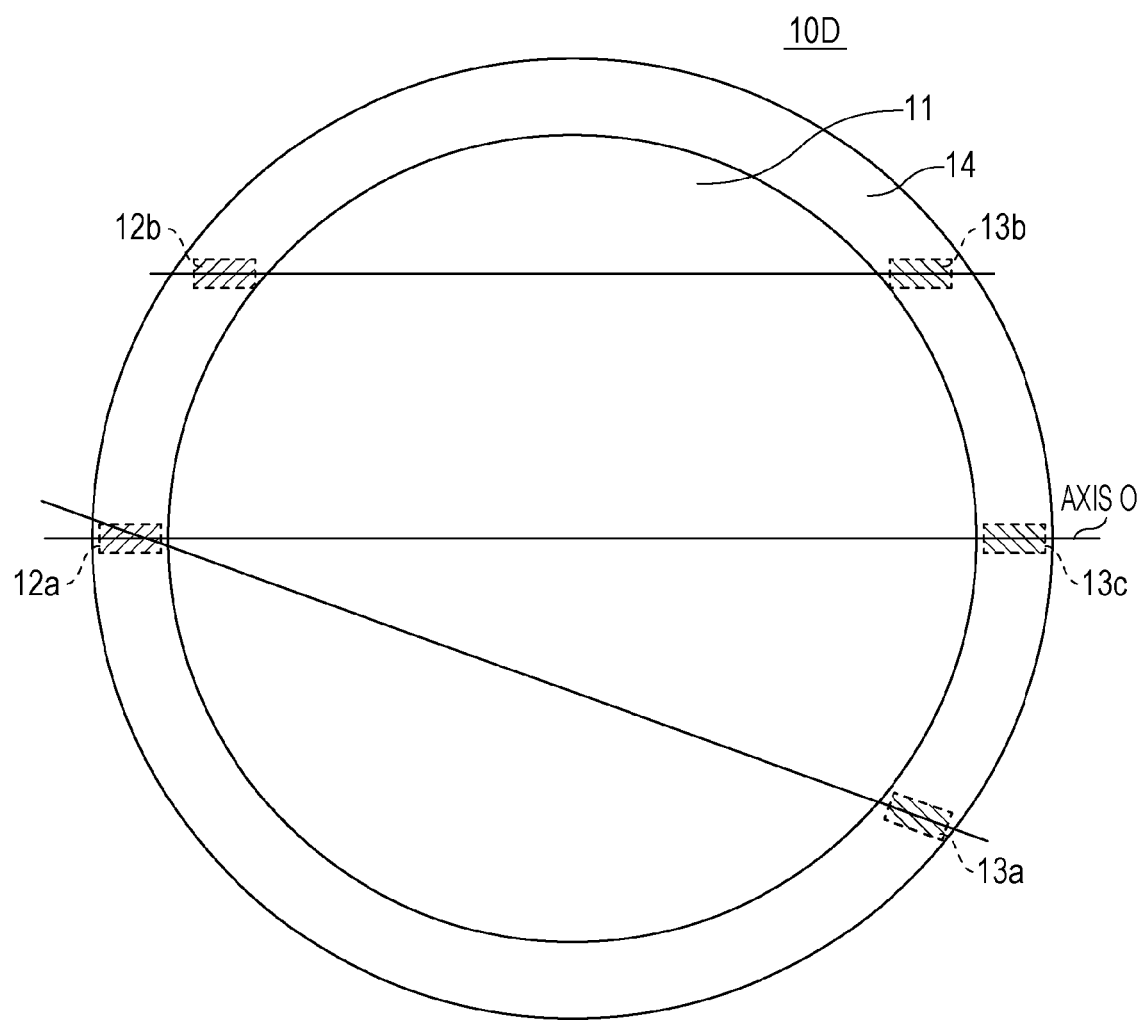

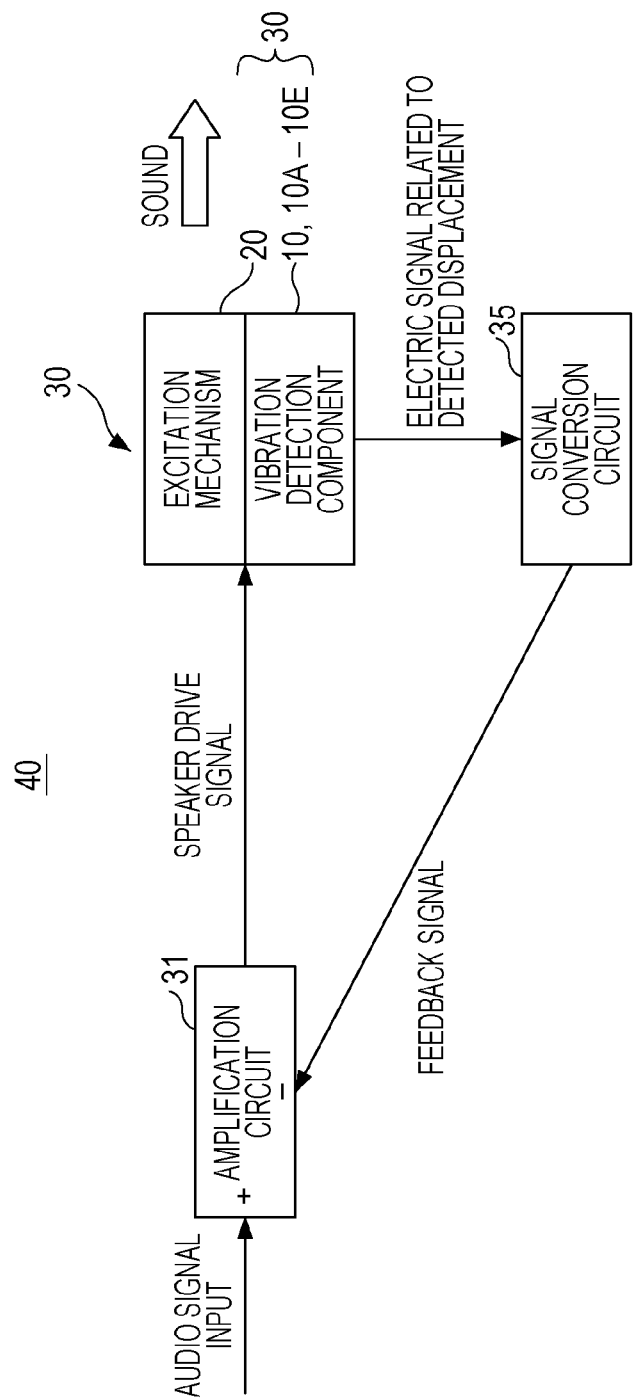

VIBRATION DETECTION COMPONENT, AND ACOUSTIC DEVICE AND INFORMATION APPARATUS USING VIBRATION DETECTION COMPONENT

CROSS-REFERENCE TO RELATED APPLICATION

This application is based upon and claims the benefit of priority of the prior Japanese Patent Application No. 2014-201818, filed on Sep. 30, 2014, the entire contents of which are incorporated herein by reference.

FIELD

The embodiment discussed herein is related to a vibration detection component, and an acoustic device and an information apparatus that use the vibration detection component.

BACKGROUND

In a user interface of an information apparatus, such as a smartphone, a display device and an input device are integrated on an identical surface by overlaying and mounting a touch sensor on a display screen or incorporating the touch sensor in the display screen. User convenience is enhanced by mounting both the display device and the input device over a sufficient area on a small-sized casing. Techniques for a thin speaker called a film speaker have been developed in recent years and overlaying a thin speaker on a display screen has been allowing the speaker to have an area larger than the area of a typical portable apparatus and be mounted without reducing the portability. A large-area speaker is favorable in terms of output of low frequency sound, compared to a small-sized speaker used typically in a portable apparatus. In addition, since such a speaker may be arranged so as to face a user, the reproduced sound is clearer for the user.

In general, the mass of a diaphragm in a speaker is a significant factor for the design of a sound quality. Assuming interfaces such as a screen display, a touch sensor input part, and an interface of a flat speaker are stacked over an identical surface, attachment of a screen protection sticker, an anti-reflection filter, or the like, or adhesion of dust causes the mass of the diaphragm to deviate from a designed value and changes the reproduced sound or frequency characteristics. Also, the reproduced sound varies when the material physical characteristics of the diaphragm, such as Young's modulus or Poisson's ratio, change as the temperature changes or time elapses. The change in the reproduced sound caused by variability in assemble or environment occurs not only in a portable apparatus, such as a smartphone, but also in the case where a film speaker is incorporated in a screen of for example, a wall-mounted television.

For the problem that the audio signal that has been input fails to be reproduced in the speaker as the designed characteristics indicate, deviation from the reproduced sound intended in the design may be minimized by detecting displacement of a diaphragm of a speaker and feeding the displacement amount back to a speaker drive amplifier. For example, Japanese Laid-open Patent Publication No. 2002-243537 proposes a configuration as a vibration detection method suitable for a small-sized microphone, where the displacement of a diaphragm is detected by reference to change in the intensity of transmitted light, which is caused by bending of the diaphragm, after forming in the diaphragm a pattern with a refractive index different from the diaphragm as an optical waveguide.

SUMMARY

According to an aspect of the invention, a vibration detection component includes a diaphragm that has a light transparency, a light emitting element that emits light into the diaphragm at a certain inclination angle relative to a normal direction of the diaphragm, and a light receiving element that receives the light emitted from the light emitting element and reflected by an interface between the diaphragm and a medium in contact with the diaphragm and converts the light into an electric signal related to vibration of the diaphragm.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a front view that illustrates an arrangement example in a case where a plurality of different measurement optical paths are set as variation 3 of the vibration detection component;

FIG. 13 is a schematic configuration diagram that illustrates a speaker that uses the vibration detection component according to the embodiment;

DESCRIPTION OF EMBODIMENTS

When a typical vibration detection method is used to detect displacement of a diaphragm of a speaker and the diameter of the speaker is approximately 10 cm, detection of minute displacement of approximately 1 μm is desired and it is difficult to obtain sufficient sensitivity by the typical method. Although in a typical configuration, a portion that easily bends is formed as part of a diaphragm so as to increase the detection sensitivity, a worry about decrease in vibration characteristics of a speaker arises when such formation is applied to the diaphragm of the speaker.

Accordingly, it is desired to provide techniques that enable vibration of a diaphragm to be detected with high sensitivity using a simple configuration.

An embodiment of the present application is described below by reference to the drawings.

Figure 1A:
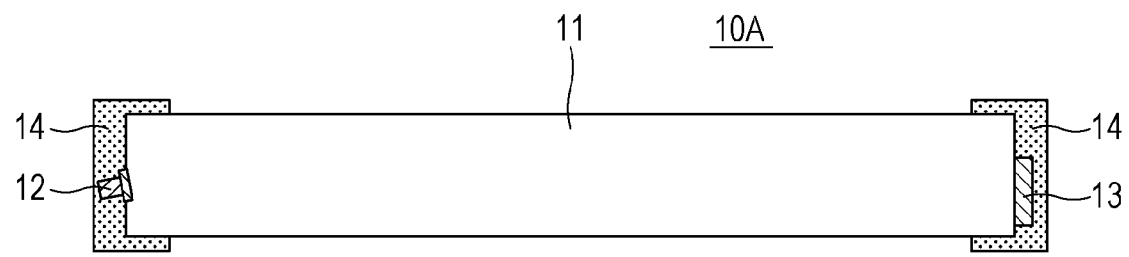
FIG. 1A is a cross-sectional view that illustrates a schematic configuration of a vibration detection component according to an embodiment.
Figure 1B:
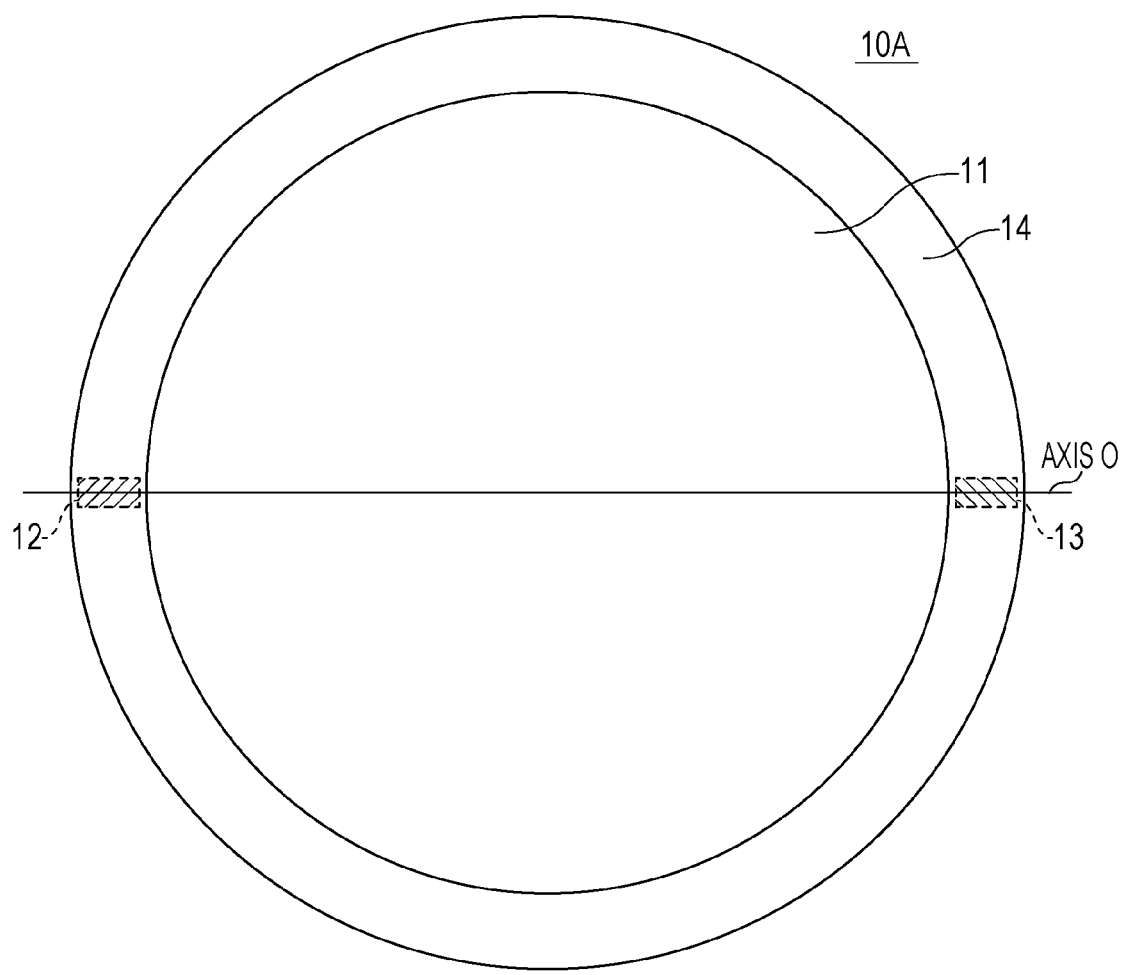
FIG. 1B is a front view that illustrates the schematic configuration of the vibration detection component according to the embodiment.

FIG. 1A is a cross-sectional view that illustrates a schematic configuration of a vibration detection component 10A according to an embodiment. FIG. 1B is a front view that illustrates the schematic configuration of the vibration detection component 10A according to the embodiment. In this example, the vibration detection component 10A is applied to a front surface plate of a display device. The vibration detection component 10A includes a diaphragm 11, which has a light transparency, a light emitting element 12, which emits light into the diaphragm 11 at a certain inclination angle relative to a normal direction, and a light receiving element 13, which receives the light reflected by the interface between the diaphragm 11 and an external medium, such as air or water and converts the received light into an electric signal depending on displacement of the diaphragm 11.

In the configuration example in FIGS. 1A and 1B, the diaphragm 11, the light emitting element 12, and the light receiving element 13 are held by a frame 14. The light emitting element 12 and the light receiving element 13 are arranged at opposite positions on an axis O extending along the diameter of the diaphragm 11, which is circular. The diaphragm 11 is formed of a transparent material, such as glass or resin, and light may pass through the diaphragm 11. Although the frame 14 may be omitted in the vibration detection component 10A, when used, the frame 14 is desirably formed of a material with a rigidity as well as or higher than the rigidity of the diaphragm 11.

In the embodiment, the displacement or vibration of the diaphragm 11 is detected by utilizing that the optical path of the light emitted from the light emitting element 12 changes, depending on the displacement of the diaphragm 11, as described below. The change in the optical path caused by a factor other than a vibration, such as the bending or distortion of the frame 14, is decreased by fixing the light emitting element 12 and the light receiving element 13 to the frame 14 that has a certain rigidity. The frame 14 is not necessarily desired to hold the entire circumference of the diaphragm 11 but may hold part of the diaphragm 11.

For example, a light-emitting diode or a laser diode may be used for the light emitting element 12. Depending on demand, the light emitting element 12 that includes a slit or a lens is used to obtain parallel light beams while inhibiting diffusion of the emitted light. For the light receiving element 13, an element that converts a light quantity into an electric signal is used, which is for example, a photodiode, a phototransistor, or a cadmium sulfide (CdS) cell.

Figure 2A:
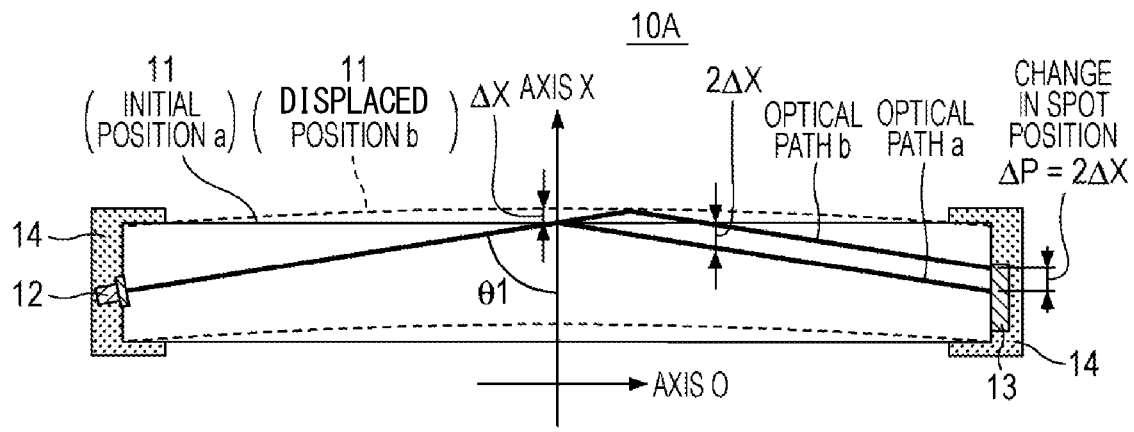
FIGS. 2A and 2B are diagrams for explaining a principle of vibration detection.
Figure 2B:
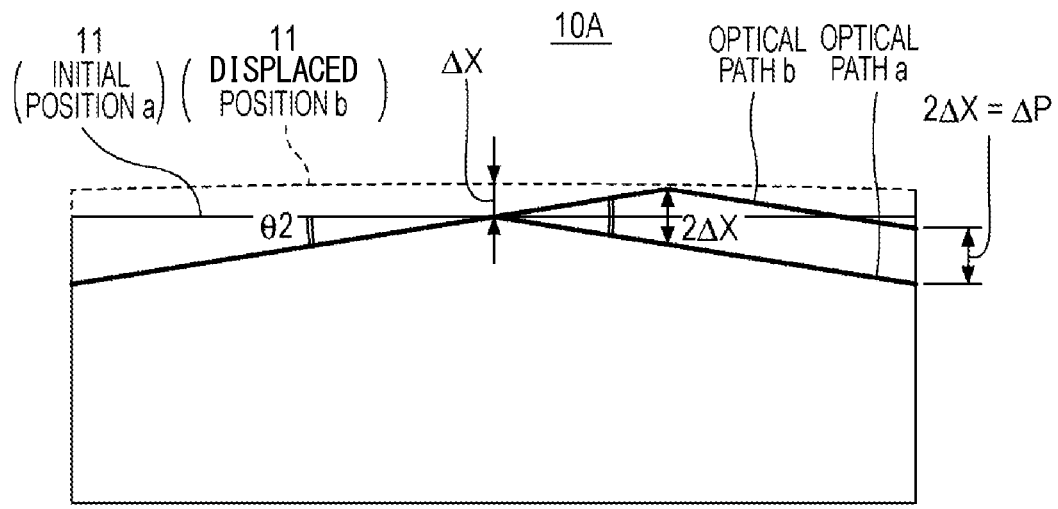

FIGS. 2A and 2B are diagrams for explaining the principle of the vibration detection of the vibration detection component 10A. The light emitting element 12 emits light into the diaphragm 11 in an oblique direction. When an axis X indicates an axis in the normal direction of the diaphragm 11 and the axis O indicates an axis in an in-plane direction of the diaphragm 11, θ1 indicates the angle that the light from the light emitting element 12 and the normal line (the axis X) form, which is the angle of incidence. The light receiving element 13 receives the light that has passed through the diaphragm 11 and has been reflected by a surface. Herein, L represents the distance between the light emitting element 12 and the light receiving element 13, and D represents the thickness of the diaphragm 11.

The diaphragm 11 depicted with a solid line is at an initial position a and undergoes no vibration from an external vibrating body or medium, such as gas or liquid. The initial position a may be referred to as a free position and the displacement of the diaphragm 11 at the initial position a is regarded as zero. In this case, the light reflected by the interface between the diaphragm 11 and the external medium passes through the optical path a and is incident on the light receiving element 13.

When the diaphragm 11 vibrates, as indicated by a dashed line, the position of the diaphragm 11 is displaced in the normal direction (the axis X). The light reflected by the surface of the diaphragm 11 passes through an optical path b and is made incident on the light receiving element 13. When ΔX represents the displacement amount of the diaphragm 11, a spot position on the light receiving element 13 changes by ΔP.

While there are some methods conceivable as a method of relating the displacement of the diaphragm 11 and the change in the optical path, total reflection between the diaphragm 11 and gas in contact with the diaphragm 11, such as air, is used in FIGS. 2A and 2B. Assumed is a case in which the light emitted from the light emitting element 12 causes total reflection on the interface between the diaphragm 11 and the air only once before reaching the light receiving element 13.

When the following expressions (1) and (2) are satisfied, the displacement amount ΔX of the diaphragm 11 may be determined according to the change ΔP in the spot position.

$$\sin θ1 > n2/n1 \qquad (1)$$

$$\tan θ1 ≈ L/2D \qquad (2)$$

n1 represents the refractive index of the diaphragm 1. n2 represents the refractive index of the air in contact with the diaphragm 11. Expression 1 indicates a condition desired for the total reflection, and Expression 2 is a condition for the spot of the light that has caused the total reflection only once to reach the light receiving element 13 exactly or to reach the vicinity of the light receiving element 13.

In this case, the change ΔP in the spot position on the light receiving element 13 is substantially equal to a distance $2 \times \Delta X$ between the optical path a and the optical path b in the direction along the normal line (the axis X).

The following expression 3 may be explained by that when the angle that the light emitted from the light emitting element 12 and the surface of the diaphragm 11 form is referred to as $\theta 2 (\theta 2=90°-\theta 1)$, two congruent right-angled triangles are made with the total reflection surface serving as a mirror as illustrated in FIG. 2B.

$$\Delta P = 2\Delta X \qquad (3)$$

As described below, the vibration amount may be determined by arranging two or more light receiving elements 13 and detecting the change in the spot position according to the change in current signals from the light receiving elements 13. As another example, as described below, a single light receiving element 13 may be used to detect the change in the spot position and determine the vibration amount according to the deviation between the size of the light spot and an effective light receiving area of the light receiving element 13. Such a configuration enables the displacement amount of the diaphragm 11 to be detected with high sensitivity without depending on the dimensions of the diaphragm 11.

Figure 3:
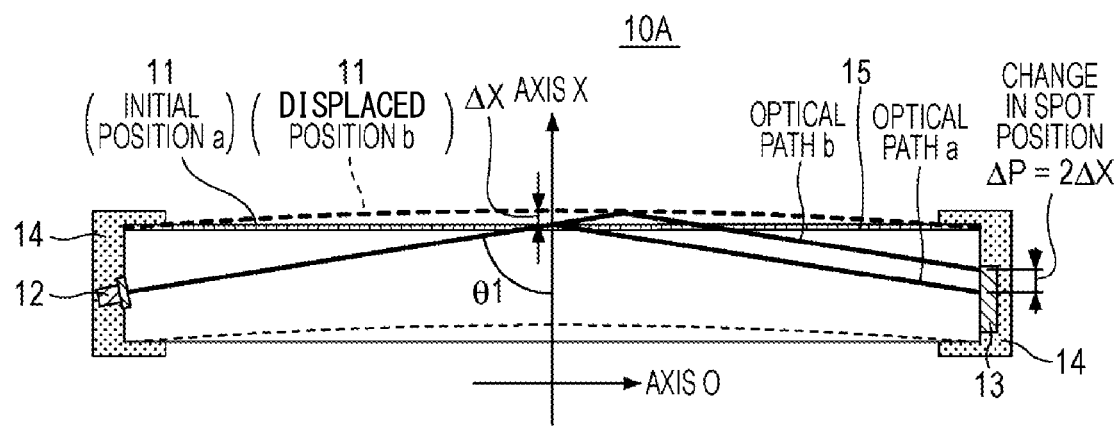
FIG. 3 illustrates an example in which a light reflection layer is arranged on a surface of the diaphragm.

FIG. 3 illustrates an example in which a light reflection layer 15 is formed on a surface of the diaphragm 11 of the vibration detection component 10A. The light reflection layer 15 is formed by for example, evaporating a metal with high reflectivity, such as silver (Ag), aluminum (Al), or a palladium-silver (Pd—Ag) alloy. Instead of utilizing the total reflection of a light beam, mirror reflection is utilized by providing the light reflection layer 15 on the surface of the diaphragm 11. The utilization of the mirror reflection enables the displacement amount or vibration to be detected even when the condition for the total reflection in Expression 1, that is, $\sin \theta 1 > n2/n1$, is not satisfied. In addition, the light reflection layer 15 may avoid decrease in the detection sensitivity, which is caused by light from outside (stray light).

The configuration in FIG. 3 is unusable as a front surface plate of a display device since the transparency of the surface of the diaphragm 11 is reduced, but may be used as a back surface plate of the display device. Accordingly, when for example, a film speaker is overlaid and arranged on the back side of the display surface of a display apparatus, deviation from designed frequency characteristics may be detected with favorable sensitivity without depending on the size of the display surface.

Figure 4:
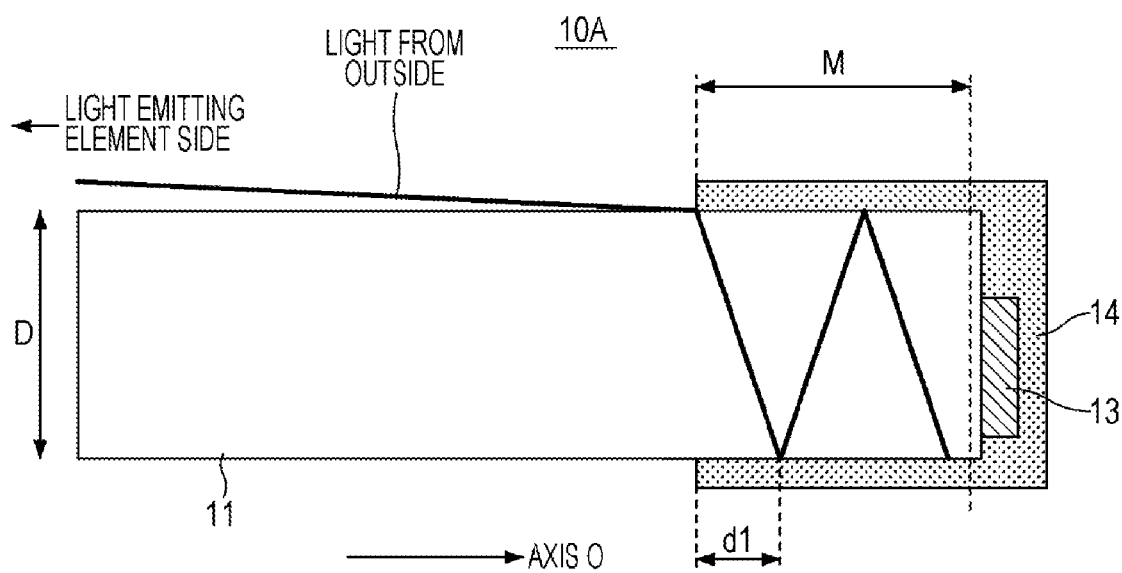
FIG. 4 is an enlarged view that illustrates the vicinity of a light receiving element of the vibration detection component.

FIG. 4 is an enlarged cross-sectional view that illustrates the vicinity of the light receiving element 13. When the diaphragm 11 without the light reflection layer 15, which is illustrated in FIG. 2, is used as the front surface plate of the display device, there is a possibility that the light from the outside will be directly incident on the light receiving element 13 after entering the diaphragm 11. In this case, the detection of the displacement of the diaphragm 11 is hindered.

Thus, a distance M between an inner end portion of the frame 14 that holds the diaphragm 11 and the light receiving surface of the light receiving element 13 is provided so as to be larger than $D \times n1/|(n2)^2-(n1)^2|^{1/2}$, which is expressed by the expression 4.

$$M > D \times n1/|(n2)^2 - (n1)^2|^{1/2} \qquad (4),$$

$D \times n1/|(n2)^2-(n1)^2|^{1/2}$ on the right side is the calculation for a condition of the critical angle and indicates a distance d1 by which the light that has entered the diaphragm 11 from the outside is refracted once and proceeds along the axis O.

Thus, it may be avoided that the light from the outside directly reaches the light receiving element 13 after entering the diaphragm 11.

Also when the incident light from the outside is made incident on the light receiving element 13 after being reflected by the frame 14, the detection of the displacement of the diaphragm 11 is similarly hindered. Accordingly, the distance M in Expression 4 is desirably provided so as to be more than three times as long as $D \times n1/|(n2)^2-(n1)^2|^{1/2}$. Since the light from the outside is reflected by the frame 14 at least three and a half times before reaching the light receiving element 13 and decreases in intensity, influence on the detection sensitivity may be suppressed so as to be small.

As another method, a material that suppresses the reflection of light or a material that absorbs light may be used for the surface that holds the diaphragm 11 of the frame 14. As another example, it may be avoided that the incident light from the outside reaches the light receiving element 13 by performing surface treatment or machining for suppressing the reflection of the light on an inner surface of the frame 14, which is the surface that holds the diaphragm 11.

<The First Variation>

Figure 5A:
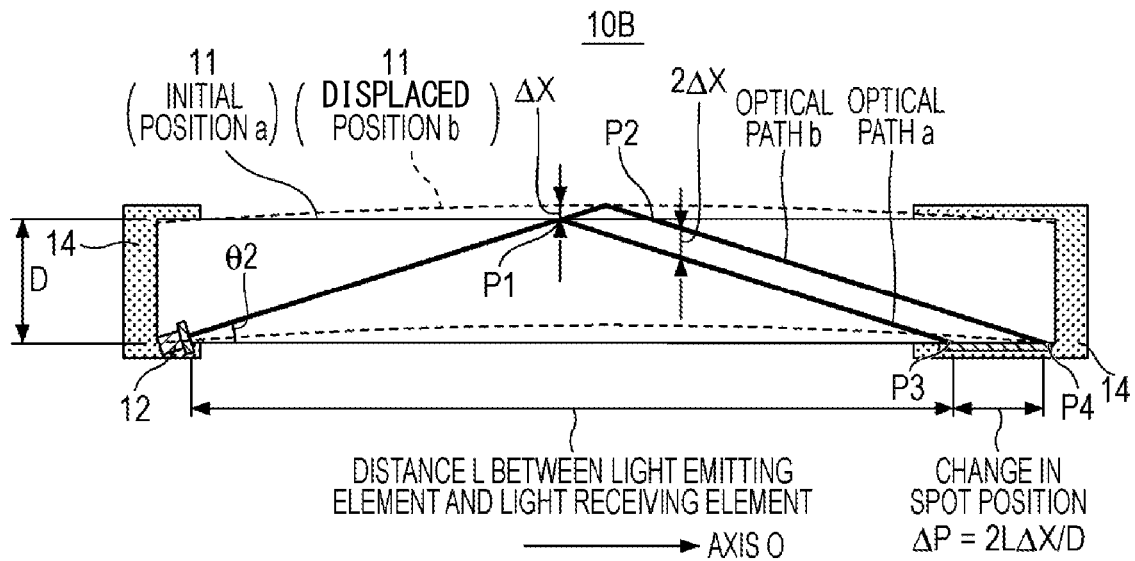
FIGS. 5A and 5B are diagrams for explaining a relation between change in a spot position and a displacement amount in a case where the light receiving element is arranged in an in-plane direction of the diaphragm as variation 1 of the vibration detection component.
Figure 5B:
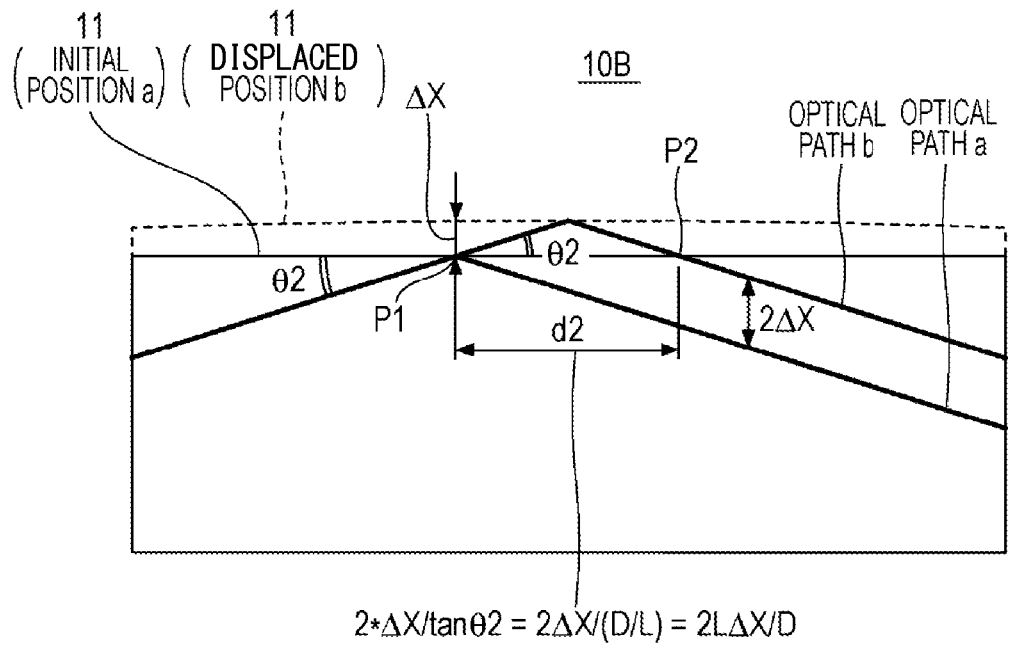

FIGS. 5A and 5B illustrate a vibration detection component 10B as variation 1. In the vibration detection component 10B, a light receiving element 23 is arranged in an in-plane direction of the diaphragm 11. In this case, change $\Delta P$ in the spot position on the light receiving element 23 may be expressed by Expression 5 using the displacement amount $\Delta X$ of the diaphragm 11.

$$\Delta P = 2L \Delta X/D \qquad (5),$$

D represents the thickness of the diaphragm 11 and L represents a distance from the light emitting element 12 to a light receiving position of the light receiving element 23 along the axis O at the initial position.

Various points are determined as followings. P1 is a point at which the light emitted from the light emitting element 12 causes total reflection at the diaphragm 11 in the initial position. P3 is a point at which the emitted light passing through the optical path a is made incident on a surface of the light receiving element 13. P2 is a point of intersection of the optical path b, which is the optical path after the displacement, and the surface of the diaphragm 11 in the initial position. P4 is a point at which the emitted light passing through the optical path b is made incident on the light receiving element 13. By connecting P1, P2, P4, and P3, a parallelogram is formed. The change $\Delta P$ in the spot position is equal to a length d2 between P1 and P2. The length d2 may be determined using the following expression, $2 \times \Delta X/\tan \theta 2 = 2 \times L \times \Delta X/D$. Thus, the displacement amount $\Delta X$ of the diaphragm 11 may be determined according to the change $\Delta P$ in the spot position on the light receiving element 23.

As illustrated in FIGS. 5A and 5B, when the light receiving element 23 is arranged along the axis O, that is, in the in-plane direction, the change in the spot position of the light on the light receiving element 23 is indicated as $2L\Delta X/D$ and small vibration of the diaphragm 11 may be detected as large change in the light spot position, compared to the vertical arrangement in FIGS. 2A and 2B, which is the arrangement in the thickness direction of the diaphragm 11. In terms of suppression of the incident light from the outside, it is desirable to combine the configuration illustrated in FIGS. 5A and 5B with the configuration in which the light reflection layer 15 is arranged on the surface as illustrated in FIG. 3.

<The Second Variation>

Figure 6A:
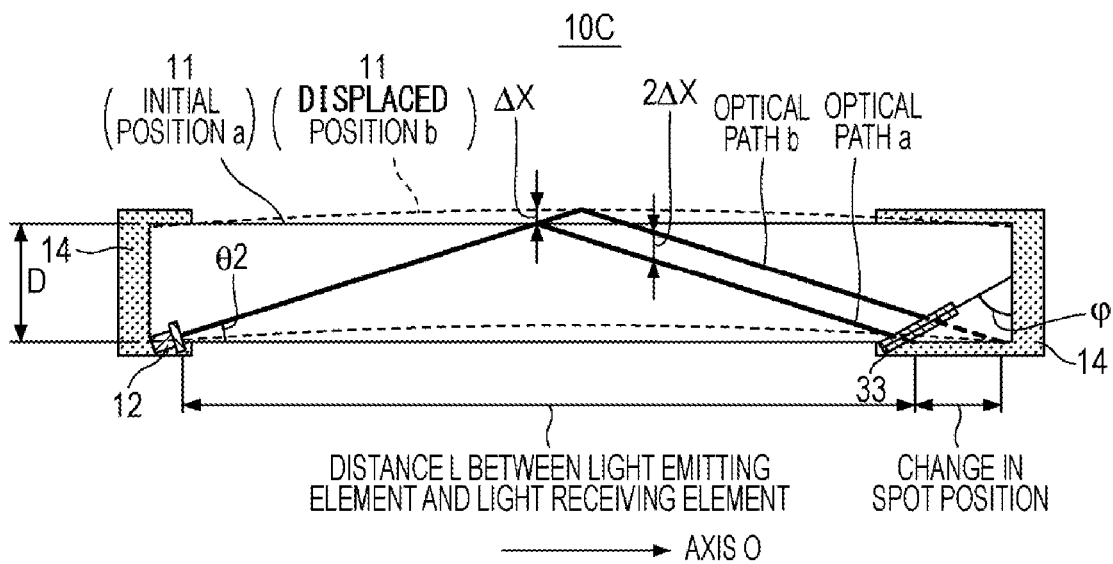
FIGS. 6A and 6B are diagrams for explaining a relation between change in the spot position and a displacement amount in a case where the light receiving element is arranged so as to be inclined relative to the in-plane direction of the diaphragm as variation 2 of the vibration detection component.
Figure 6B:
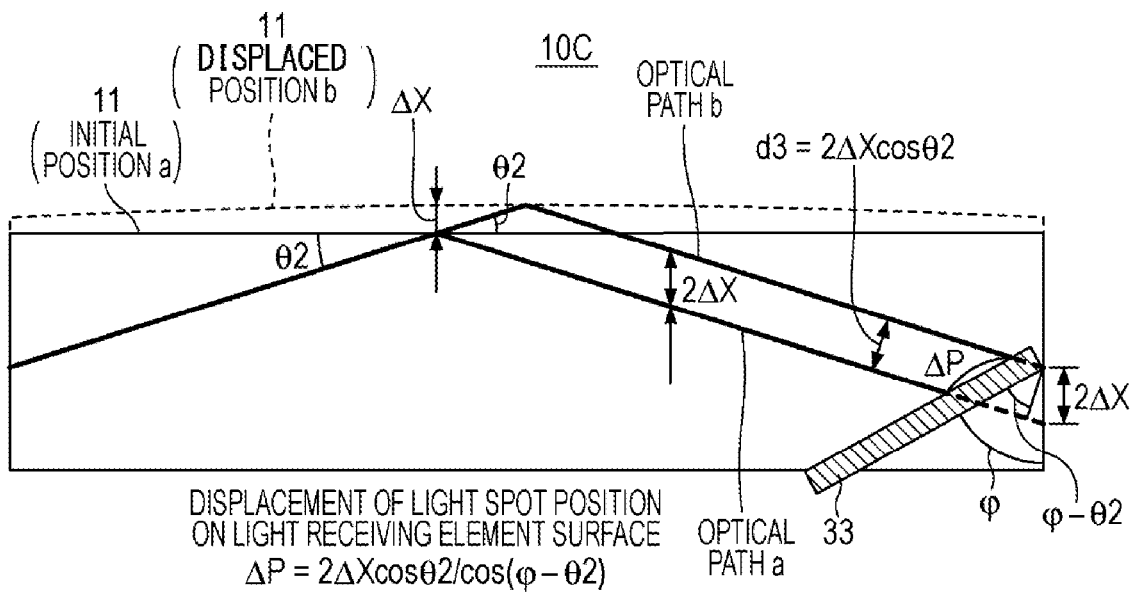

FIGS. 6A and 6B illustrate a vibration detection component 10C as variation 2. In the vibration detection component 10C, a light receiving element 33 is arranged so as to be inclined by an angle φ relative to the normal line (the axis X) of the diaphragm 11. In this case, the change ΔP in the spot position on the light receiving element 33 may be expressed by the following Expression 6 using the displacement amount ΔX of the diaphragm 11.

$$\Delta P = 2\Delta X \cos \theta 2 / \cos(\phi - \theta 2) \quad (6)$$

θ2 represents the angle that the light emitted from the light emitting element 12 forms with respect to the incident surface of the diaphragm 11, that is, 90°−θ1. When an additional line perpendicular to the optical paths a and b is drawn and the distance between the optical path a and the optical path b is referred to as d3, the Expression 6 is deformed to the following Expression 7 by using d3=2ΔX cos θ2. Accordingly, ΔP in Expression 6 may be determined.

$$\cos(\phi - \theta 2) = \Delta P/d = \Delta P/2\Delta X \cos \theta 2 \quad (7)$$

The angle θ2 depends on the thickness of the diaphragm 11 and a distance L between the light emitting element 12 and the light receiving element 33 as expressed by the expression, tan θ2=D/2L. The angle φ may be freely changed according to the arrangement design of the light receiving element 33. When the vibration detection component is applied to a large-diameter speaker, the vibration detection sensitivity may be reduced since the beam diameter tends to become larger as the optical path of the light beam increases in length, and since the displacement of the diaphragm 11 for obtaining the same volume level is small in the large-diameter speaker, compared to a small-diameter speaker. In such a case, optimal vibration detection sensitivity that suits the size (diameter) of the speaker may be obtained by arranging the light receiving element 33 so as to be inclined and adjusting the angle φ.

Figure 7:
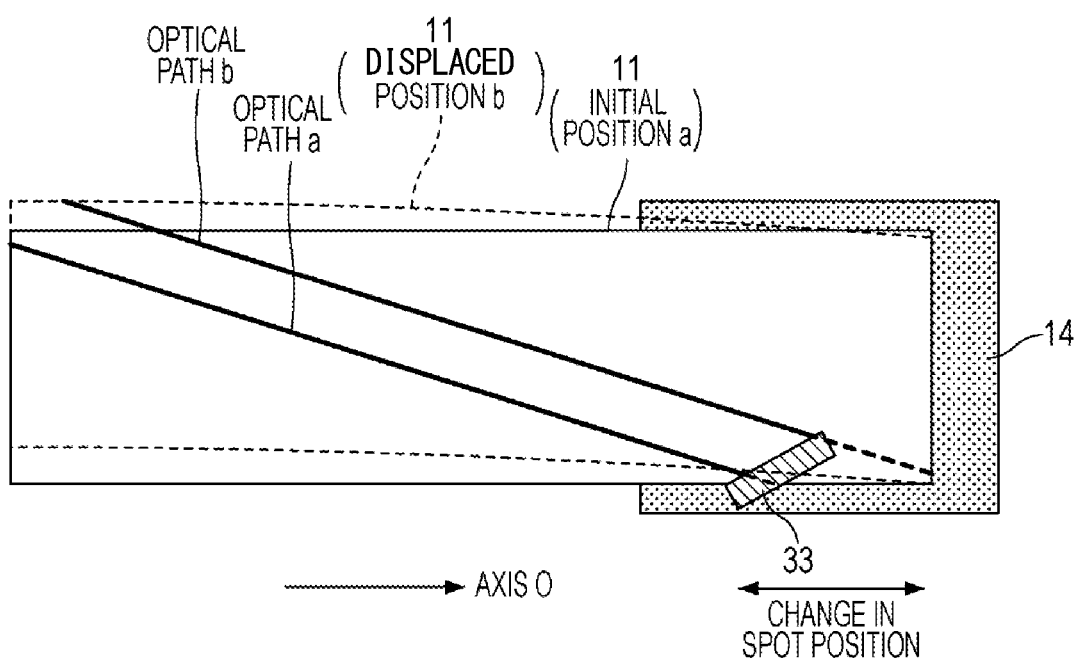
FIG. 7 illustrates a configuration example according to variation 2, where a single light receiving element is used.

FIG. 7 illustrates a configuration example in which a single light receiving element 33 is arranged so as to be inclined. When the single light receiving element 33 is used, the position of the optical path of the reflected light deviates due to the vibration of the diaphragm 11 and as a result, deviation occurs in the size of the light spot and an effective light receiving area of the light receiving element 33. The effective light receiving area may be determined according to the amount of the current from the light receiving element 33. The displacement of the diaphragm 11 may be detected according to the deviation of the effective light receiving area.

Figure 8A:
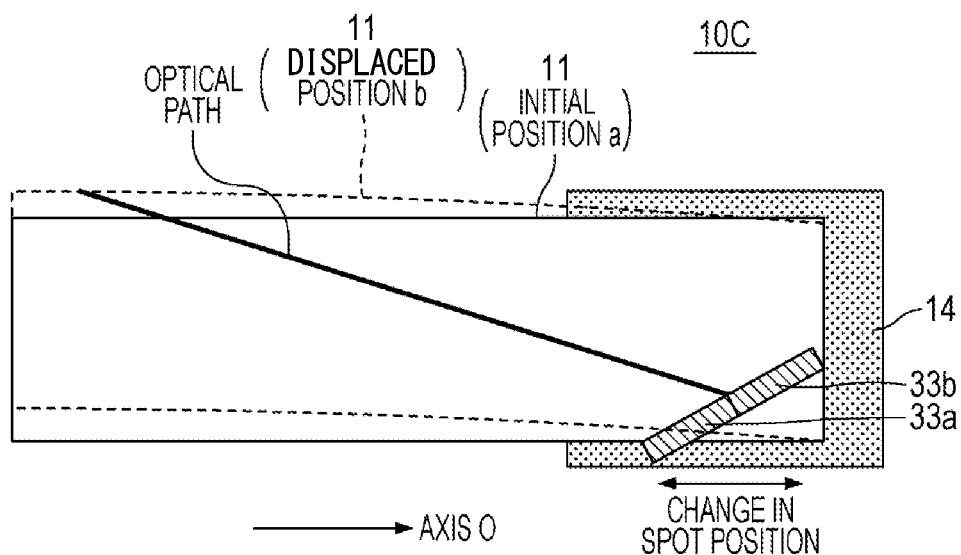
FIGS. 8A and 8B illustrate a configuration example according to variation 2, where two light receiving elements are used.
Figure 8B:
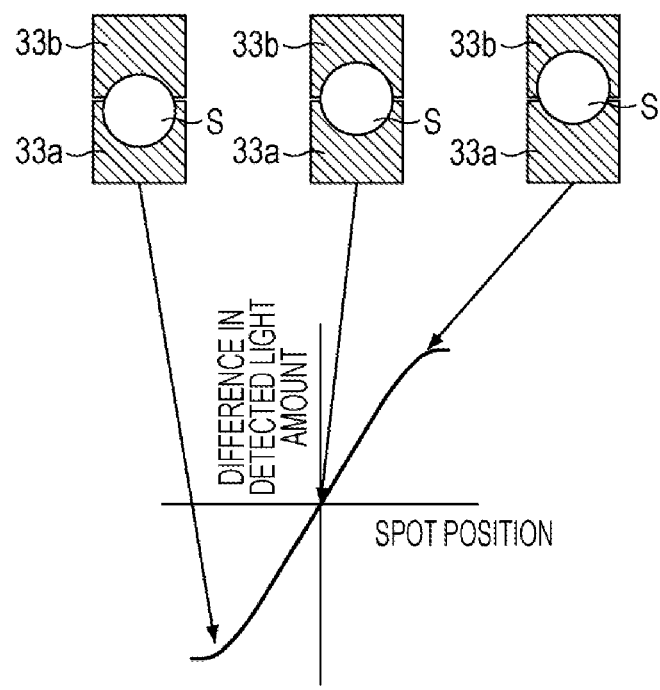

FIGS. 8A and 8B illustrate a configuration example in which two light receiving elements 33a and 33b are used. The light receiving elements 33a and 33b are designed so that the light receiving elements 33a and 33b are arranged next to each other and the light receiving surfaces of the light receiving elements 33a and 33b constitute an identical plane, and the light spot at the initial position meets the center of both the light receiving surfaces. In this case, as illustrated in FIG. 8B, the difference between the light quantities (current) detected in the two light receiving elements 33a and 33b is zero. When the vibration of the diaphragm 11 changes the optical path and the light spot deviates to the side of the light receiving element 33a, the light quantity difference changes in the minus direction, and when the light spot deviates to the side of the light receiving element 33b, the light quantity difference changes in the plus direction. This method is favorable in linearity and enables the absolute amount of the displacement of the diaphragm 11 including the direction of the displacement to be measured correctly. The detection method of the light receiving position is not limited to the example illustrated in FIG. 8B, and the direction of the change in the light quantity may be opposite the direction indicated in FIG. 8B, or the ratio between the light quantities (current) of the two light receiving elements 33a and 33b may be used instead of the light quantity difference.

Figure 9:
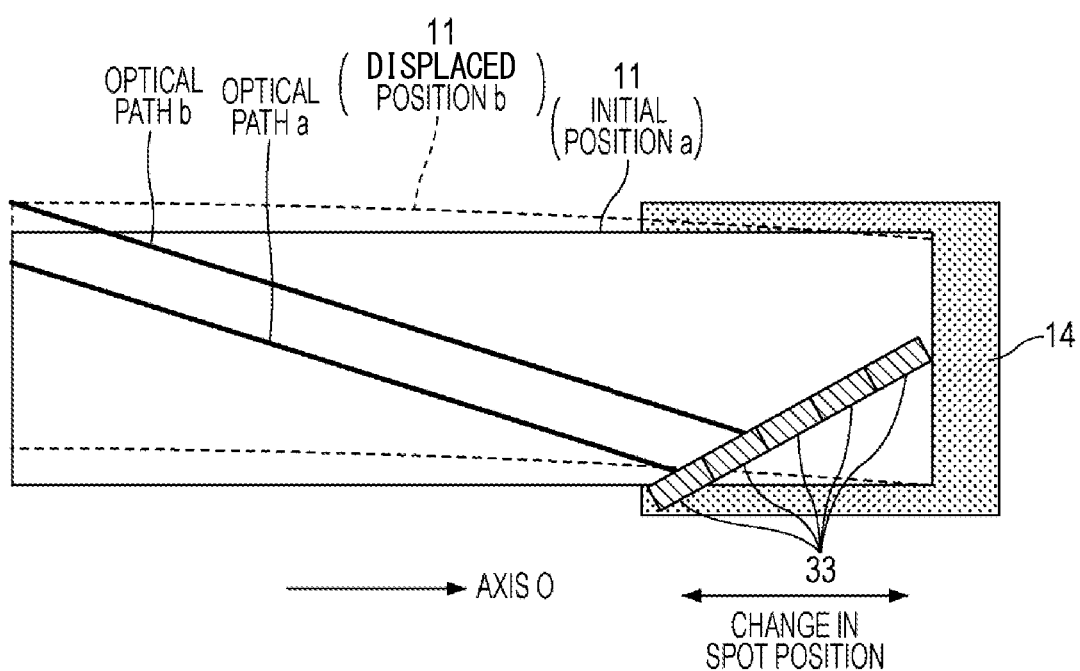
FIG. 9 illustrates a configuration example according to variation 2, where three or more light receiving elements are used.

FIG. 9 illustrates a configuration example in which three or more light receiving elements 33 are arranged. When for example, a plurality of photodiodes are arranged, the change in the position of the element that has detected the largest light quantity may be detected as discrete displacement that corresponds to the array pitches of the photodiodes. Displacement minuter than the array pitches of the photodiodes may be detected in an analog manner by combining the configuration in FIG. 9 with the change in the light quantity difference or light quantity ratio between the adjacent elements in FIGS. 8A and 8B. Thus, a wide dynamic range may be secured.

Any one of the configurations in FIGS. 7 to 9 and the configuration obtained by combining FIGS. 8A and 8B with FIG. 9 may be applied to the arrangement of the light receiving element in the normal direction in FIGS. 2A and 2B or the in-plane arrangement according to variation 1.

<The Third Variation>

FIG. 10 illustrates a configuration of a vibration detection component 10D according to variation 3. In the vibration detection component 10D, measurement optical paths different from each other are set between the light emitting element 12 and the light receiving element 13. In the example of FIG. 10, a measurement optical path between a light emitting element 12a and a light receiving element 13a, a measurement optical path between the light emitting element 12a and a light receiving element 13c, and a measurement optical path between a light emitting element 12b and a light receiving element 13b are set. Vibration (displacement) in a portion other than the center of the diaphragm 11 may be detected by changing the direction in which the light beam proceeds.

While there is a possibility that the change in the light spot on the light receiving element 13 will be excessively large, depending on the diameter of a speaker, vibration detection that causes no saturation even when the vibration is large is enabled by detecting vibration in an edge portion, where the displacement is small, compared to a central portion.

Further, vibration detection at a plurality of positions of the diaphragm 11 is enabled by using a plurality of pairs of the light emitting elements 12 and the light receiving elements 13. As illustrated in FIG. 10, the number of light emitting elements may be reduced by dividing a light beam using the light emitting element 12a in common for the light receiving elements 13a and 13c.

<The Fourth Variation>

Figure 11A:
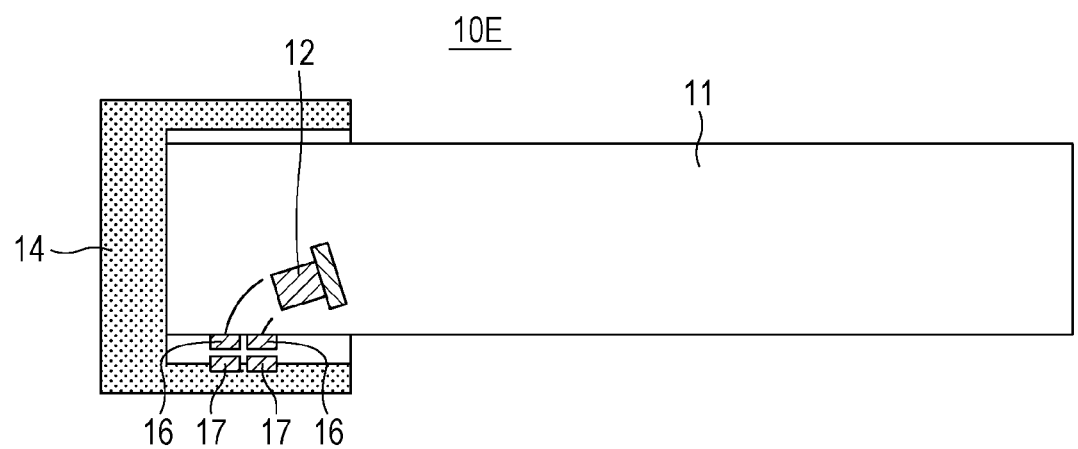
FIGS. 11A and 11B illustrate an example in which the light emitting element is incorporated inside the diaphragm.
Figure 11B:
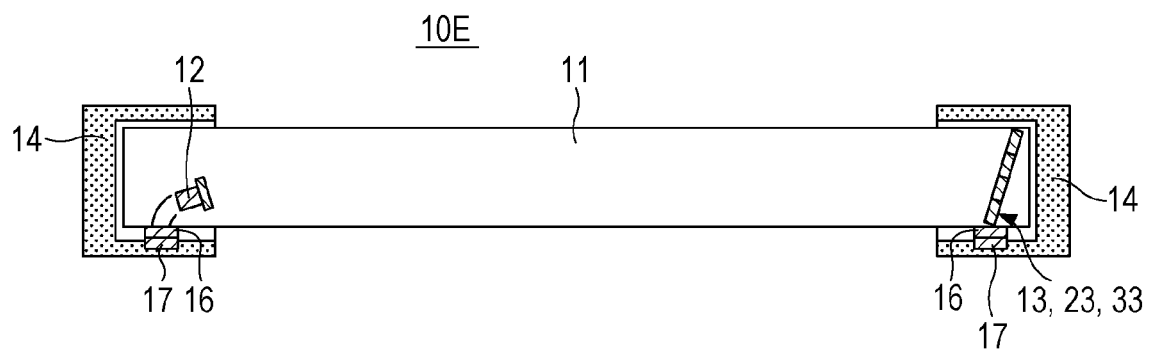

FIGS. 11A and 11B illustrate a vibration detection component 10E according to the fourth variation. Although the light emitting element 12 and the light receiving element 13, 23, or 33 are fixed to the frame 14 in the basic configuration in FIGS. 2A and 2B and the first to third variations. As illustrated in FIG. 11, the light emitting element 12 and the light receiving element 13, 23, or 33 may be embedded in the diaphragm 11.

In this case, electrodes 16 are formed on a surface of the diaphragm 11 to perform wiring connection between the light emitting element 12 and the light receiving element 13, 23, or 33. The frame 14 is provided with electrodes 17 opposite to the electrodes 16 of the element side and is structured so as to sandwich the diaphragm 11. Accordingly, the vibration detection sensitivity may be decided simply by the design of the diaphragm 11, the light emitting element 12, and the light receiving element 13, 23, or 33. Replacement with the vibration detection component 10E with different vibration detection sensitivity is enabled simply by mounting the vibration detection component 10E in the frame 14, and efficiency of the assembly process and simplification may be achieved.

Application Examples

Figure 12A:
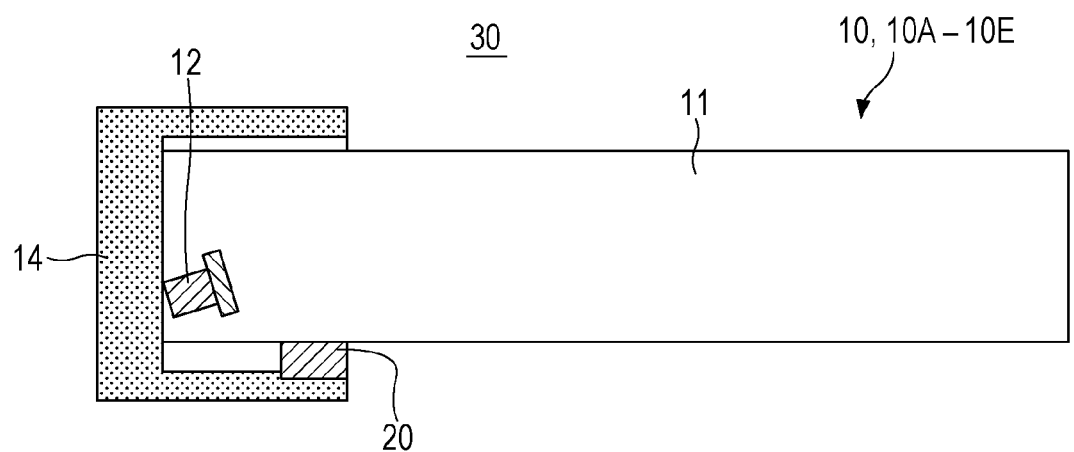
FIGS. 12A and 12B illustrate an example in which the vibration detection component is applied to a front surface plate of a speaker or a microphone.
Figure 12B:
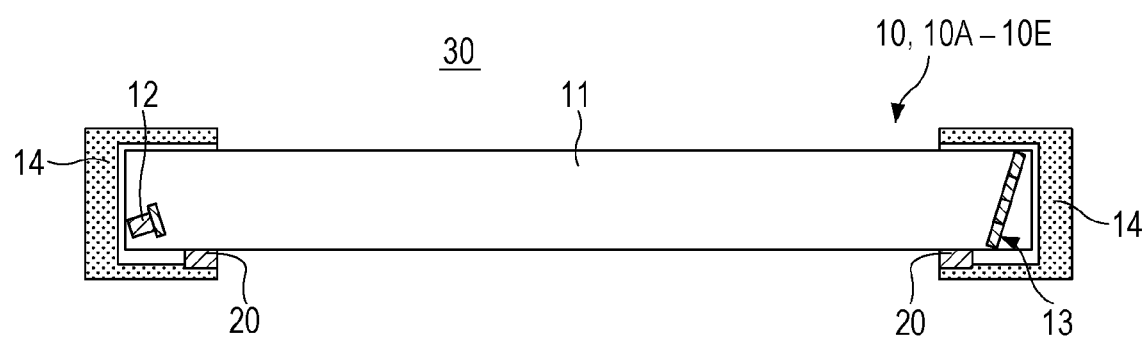

FIGS. 12A and 12B illustrate an example in which a vibration detection component 10 is applied to a front surface plate 30 for a speaker or a microphone. The vibration detection component 10 may employ any one of the configurations of the above-described vibration detection components 10A to 10E. The front surface plate 30 includes the vibration detection component 10 and an excitation mechanism 20. The diaphragm 11 of the vibration detection component 10 is caused to vibrate with the excitation mechanism 20. For example, the excitation mechanism 20 is attached inside the frame 14 that holds the vibration detection component 10. Bending is propagated to the diaphragm 11, and a speaker that produces sound from the entire diaphragm 11 or a microphone that collects sound with the entire diaphragm 11 may be configured. The audio output of the speaker and the vibration detection of the vibration detection component 10 are compatible with each other. Similarly, the sound collection of the microphone and the vibration detection of the vibration detection component 10 are compatible with each other. When the excitation mechanism 20 is made up of a transparent piezo element and a transparent electrode, the excitation mechanism 20 with a large area may be arranged on a back or front surface of the diaphragm 11 without reducing light transmission characteristics of the vibration detection component 10. The excitation mechanism 20 may be constituted of a voice coil and a magnet.

FIG. 13 illustrates an example in which the front surface plate 30 is applied to a speaker 40 as an acoustic device. The displacement of the diaphragm 11 is detected with the vibration detection component 10 of the front surface plate 30 and a detection signal is supplied to a signal conversion circuit 35. The signal conversion circuit 35 converts the displacement amount of the detected light quantity or light spot position at the light receiving element 13 into an electric signal corresponding to the displacement of the diaphragm 11 and outputs the electric signal. The signal conversion circuit 35 may be a stabilization circuit, such as a proportional-integral (PI) control circuit or a proportional-integral-derivative (PID) control circuit, or may be a signal conversion circuit using a lookup table (LUT).

The converted electric signal is fed back to an amplification circuit 31. The amplification circuit 31 generates and outputs a speaker drive signal based on the feedback signal, and the speaker drive signal minimizes an error between the actual reproduced sound and the designed reproduced sound. The speaker drive signal is supplied to the excitation mechanism 20 and the excitation intensity is adjusted. According to the configuration, the quality of the reproduced sound of the speaker 40 may be increased.

When a film speaker is used, typically, an error between the electric signal to be reproduced and the sound that is actually output is caused by the characteristics of the front surface plate 30 for the speaker, the characteristics of the excitation mechanism 20, adhesion of a substance to the front surface plate 30, change in the environmental temperature, or the like. More correct sound output in accordance with an input signal is enabled by correcting the error through feedback control. Because of using the vibration detection component 10A, 10B, 10C, 10D, or 10E according to the embodiment for the front surface plate 30, the vibration amount of the diaphragm 11 may be detected with high sensitivity according to the change in the optical path of the light that passes through the diaphragm 11 and stable reproduced sound may be output.

Figure 14A:
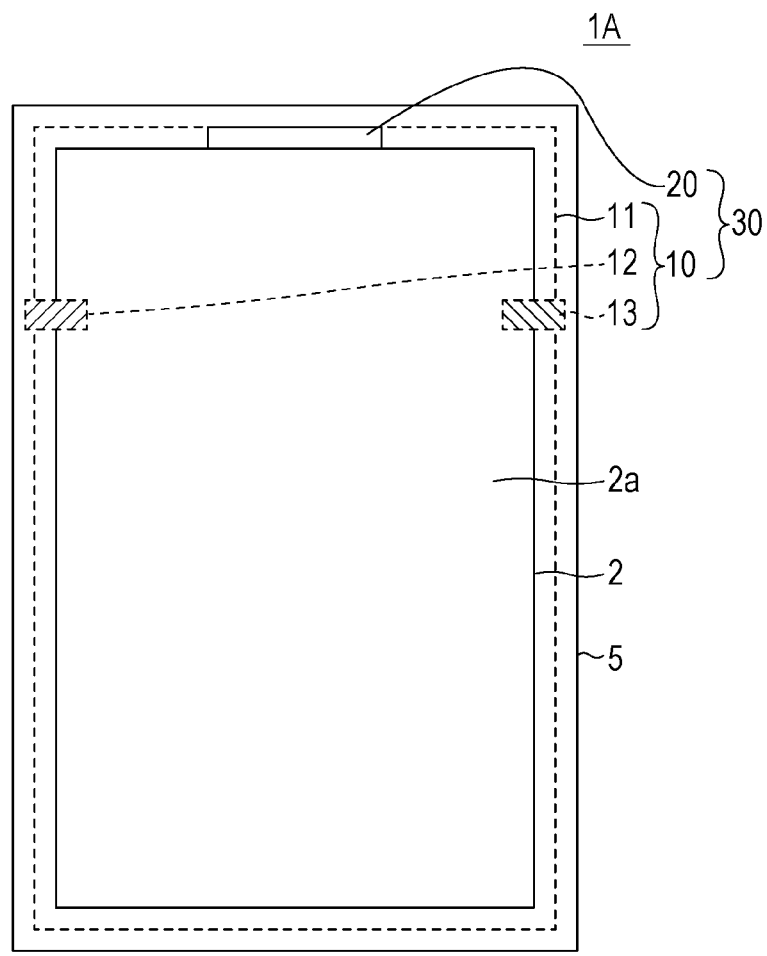
FIGS. 14A and 14B illustrate a configuration example in which the vibration detection component according to the embodiment is applied to an information apparatus.
Figure 14B:
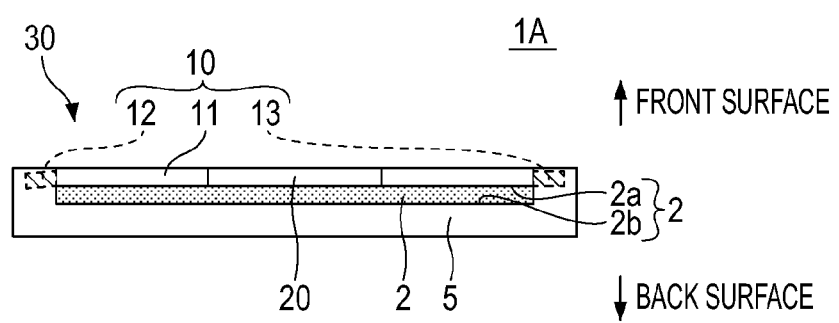

FIGS. 14A and 14B illustrate an example in which the front surface plate 30 according to the embodiment is applied to an information apparatus 1A. FIG. 14A is a front view and FIG. 14B is a side view. In this example, the vibration detection component 10 is arranged so as to be overlaid on a display surface 2a of a display 2 and the excitation mechanism 20 is arranged in a casing 5 of the information apparatus 1A so as to be adjacent to the display 2. The display 2 includes a liquid crystal or organic electroluminescent (EL) 2b and a touch sensor, which is not illustrated.

The information apparatus 1A further includes the signal conversion circuit 35 and the amplification circuit 31, which are not illustrated in FIGS. 14A and 14B. When the excitation mechanism 20 excites an end portion of the display 2 on receiving input of the speaker drive signal, the entire display screen including the vibration detection component 10 vibrates. As described above, the vibration detection component 10 detects displacement and the feedback control is performed during reproduction of sound. Accordingly, stable reproduced sound may be output from the overall display screen of the information apparatus 1A, which is thin.

Figure 15A:
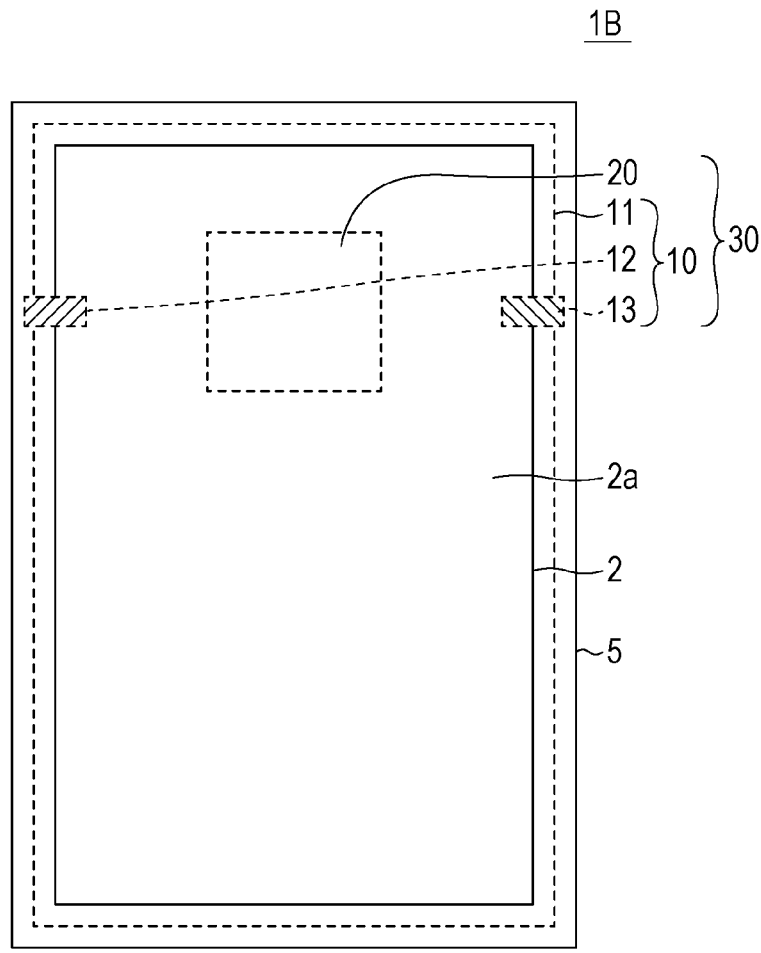
FIGS. 15A and 15B illustrate another configuration example in which the vibration detection component according to the embodiment is applied to an information apparatus.
Figure 15B:
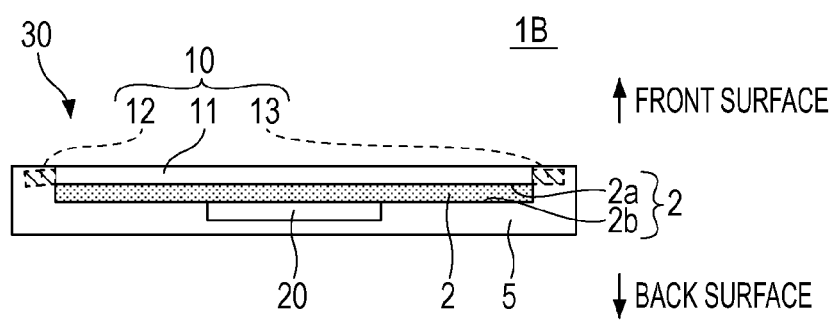

FIGS. 15A and 15B illustrate an example in which the front surface plate 30 according to the embodiment is applied to an information apparatus 1B. FIG. 15A is a front view and FIG. 15B is a side view. Similar to FIGS. 14A and 14B, the vibration detection component 10 is arranged on the front surface of the display 2. The excitation mechanism 20 is arranged on the back surface of the display 2. Excitation of the entire display screen is enabled without reducing the viewability of the screen by arranging the excitation mechanism 20 on the back surface of the display 2.

Figure 16:
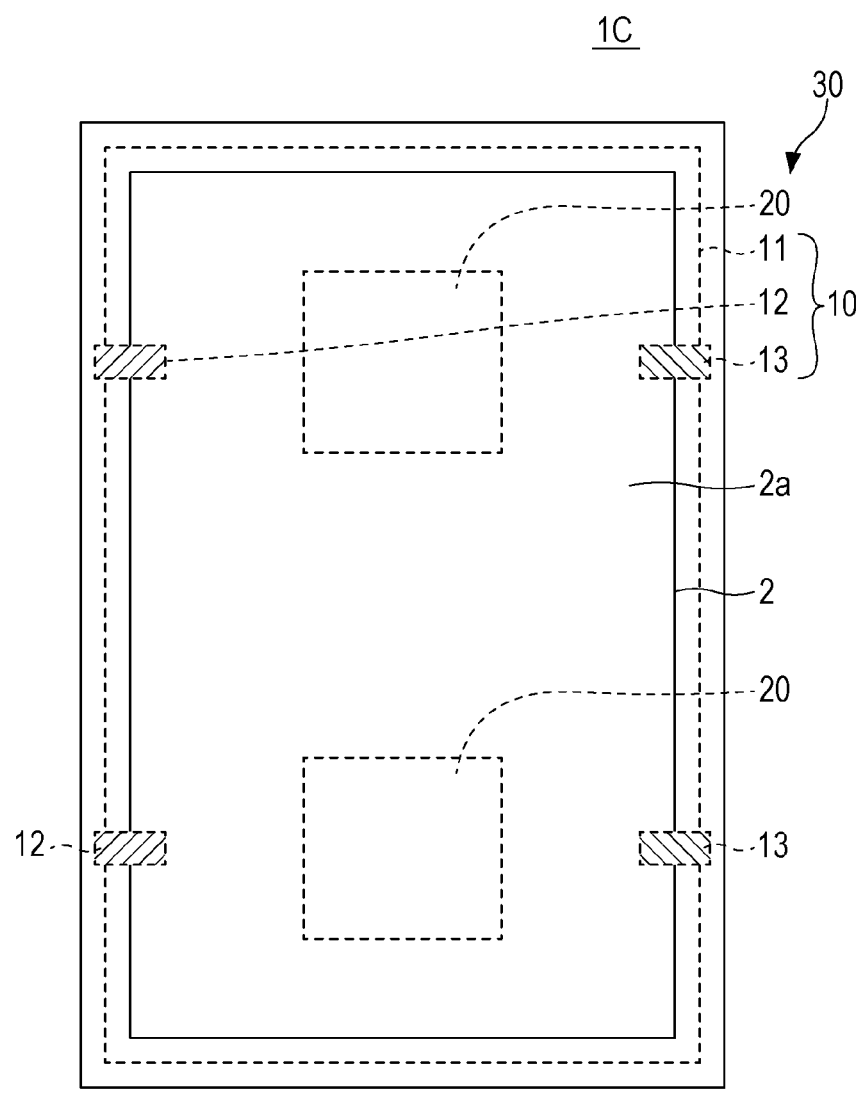
FIG. 16 illustrates still another configuration example in which the vibration detection component according to the embodiment is applied to an information apparatus.

FIG. 16 is an example in which the front surface plate 30 according to the embodiment is applied to an information apparatus 1C. In this example, the vibration detection component 10, where the diaphragm 11 is provided with a plurality of light emitting elements, 12, and a plurality of light receiving elements, 13, is used. In this example, two excitation mechanisms, which are the excitation mechanisms 20, are attached at different positions on the back surface of the display 2 and a pair of the light emitting element 12 and the light receiving element 13 is arranged so as to correspond to each of the excitation mechanisms 20. The pair of the light emitting element 12 and the light receiving element 13 detects the displacement of the diaphragm 11 at the position corresponding to the excitation mechanism 20. According to this configuration, it is enabled to produce sound of a plurality of channels on the single display surface 2a.

The front surface plate 30 that uses the vibration detection component 10 according to the embodiment enables arrangement of a sound source with a high sound quality on the display screen by being overlaid on the information apparatuses 1A to 1C or a front surface of a given device intended for visual presentation. A large-area speaker that makes the effective utilization of the display screen of the device may enhance the realism. For example, the application to what is intended for visual exhibition, such as a transparent covering of a water tank or a pictorial work, or to a window is also possible.

The shape of the diaphragm 11 is not limited to a rectangle or a circle but may be a given shape, such as a square, an ellipse, a rhombus, or a hexagon. Since the change in the vibration of the diaphragm 11 may be detected with high sensitivity without depending on the dimensions or shape of the diaphragm 11, even when change in physical characteristics occurs in the front surface plate 30, decrease in the sound quality, which is caused by the change in the vibration characteristics, may be avoided and reproduction with fidelity to the original sound is enabled.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A vibration detection component comprising:
   a diaphragm that has a light transparency;
   alight emitting element that emits light into the diaphragm at a certain inclination angle relative to a normal direction of the diaphragm; and
   a light receiving element that receives the light emitted from the light emitting element and reflected by an interface between the diaphragm and a medium in contact with the diaphragm and converts the light into an electric signal related to vibration of the diaphragm.

2. The vibration detection component according to claim 1, wherein
   the diaphragm is in contact with an external medium with a refractive index lower than a refractive index of the diaphragm and the interface satisfies a total reflection condition.

3. The vibration detection component according to claim 2, further comprising:
   a frame that holds the diaphragm, the light emitting element, and the light receiving element, wherein
   when the refractive index of the diaphragm is referred to as n1, the refractive index of the external medium is referred to as n2, a thickness of the diaphragm is referred to as D, and a distance from an inner end portion of the frame that holds the diaphragm to the light receiving element is referred to as M, $M > D \times n1 / |(n2)^2 - (n1)^2|^{1/2}$ is satisfied.

4. The vibration detection component according to claim 1, further comprising:
   a light reflection layer formed on a surface of the diaphragm, wherein
   the interface between the diaphragm and the light reflection layer satisfies a mirror reflection condition.

5. The vibration detection component according to claim 1, wherein
   the light emitting element and the light receiving element are embedded in the diaphragm so as to be opposite each other across the diaphragm.

6. The vibration detection component according to claim 5, further comprising:
   a frame that holds the diaphragm, wherein
   an element electrode that electrically couples the light emitting element and the light receiving element is provided on a surface of the diaphragm and an opposite electrode is provided on the frame so as to be positioned opposite the element electrode.

7. The vibration detection component according to claim 1, wherein
   a light receiving surface of the light receiving element is arranged so as to be parallel to an axis in the normal direction of the diaphragm.

8. The vibration detection component according to claim 1, wherein
   a light receiving surface of the light receiving element is arranged so as to be perpendicular to an axis in the normal direction of the diaphragm.

9. The vibration detection component according to claim 1, wherein
   a light receiving surface of the light receiving element is arranged so as to be inclined relative to the normal direction of the diaphragm.

10. The vibration detection component according to claim 1, wherein
    two or more pairs of the light emitting elements and the light receiving elements are arranged.

11. The vibration detection component according to claim 1, wherein
    a point that connects the light emitting element and the light receiving element does not pass through a center of the diaphragm.

12. An acoustic device comprising:
    a vibration detection component including,
    a diaphragm that has a light transparency,
    a light emitting element that emits light into the diaphragm at a certain inclination angle relative to a normal direction of the diaphragm, and
    a light receiving element that receives the light emitted from the light emitting element and reflected by an interface between the diaphragm and a medium in contact with the diaphragm and converts the light into an electric signal related to vibration of the diaphragm;
    an excitation mechanism that causes the vibration detection component to vibrate; and
    an amplification circuit that according to the electric signal output from the vibration detection component and an audio input signal, generates a drive signal to drive the excitation mechanism.

13. The acoustic device according to claim 12, further comprising:
    a signal conversion circuit that converts the electric signal into a control signal indicating the vibration or a displacement amount of the diaphragm, wherein
    the control signal is input to the amplification circuit.

14. An information apparatus comprising:
    a display;
    a vibration detection arranged on a front surface or a back surface of the display, the vibration detection component including,
    a diaphragm that has a light transparency,
    a light emitting element that emits light into the diaphragm at a certain inclination angle relative to a normal direction of the diaphragm, and
    a light receiving element that receives the light emitted from the light emitting element and reflected by an interface between the diaphragm and a medium in contact with the diaphragm and converts the light into an electric signal related to vibration of the diaphragm;

an excitation mechanism that causes the vibration detection component to vibrate; and an amplification circuit that according to the electric signal output from the vibration detection component and an audio input signal, generates a drive signal to drive the excitation mechanism.

* * * * *